Dec. 30, 1969     L. R. BURT     3,486,308

AIR TREATMENT

Original Filed June 16, 1961

INVENTOR.
LESLIE R. BURT
BY Angus & Mon
ATTORNEYS.

United States Patent Office 3,486,308
Patented Dec. 30, 1969

3,486,308
AIR TREATMENT
Leslie R. Burt, West Arcadia, Calif., assignor to Hexatron, Inc., Arcadia, Calif., a corporation of California
Substituted for abandoned application Ser. No. 116,589, June 16, 1961. This application Jan. 2, 1968, Ser. No. 694,991
Int. Cl. B01d 49/00
U.S. Cl. 55—270                                    1 Claim

ABSTRACT OF THE DISCLOSURE

This disclosure relates to air treatment, and particularly to means for purifying air and collecting germs therefrom.

A device for treating air according to the present disclosure includes an interior and an exterior housing. The exterior housing has a filter means for filtering particulate matter, such as dust and pollen from air flowing through an inlet opening. An ultraviolet lamp is located within the interior housing and generates ultraviolet radiation having a wave length above 1800 A. for sterilizing the air. The ultraviolet radiation also aids in negatively ionizing the air. A blower is provided for causing the air to flow through the filter means, the interior housing and a plurality of baffles is provided in the interior housing so that the path length of the air flow is longer than the length of the interior housing, thereby exposing the air flowing therethrough to the radiation from the ultraviolet lamp for greater periods of time. The surface of the interior housing and of the baffles is preferably provided with a reflective finish.

According to one feature of the present disclosure, the device may be used for bacteria sampling purposes wherein a growth medium is supported within the interior housing to collect bacteria from the air passing therethrough. Switch means is provided to turn off the ultraviolet lamp so that the bacteria is not killed during the sampling process. The live bacteria are grown on the growth medium so that analytical quantities of bacteria are obtained. The bacteria may then be killed by turning on the ultraviolet lamp and directing radiation at the bacteria, whereupon the bacteria may be removed and subjected to analytical tests to determine the bacteria content of the environment.

---

This application is, in part, a substitute of application Ser. No. 116,589 by Leslie R. Burt, filed June 16, 1961 for "Air Purifier and Germ Collector" and assigned to the same assignee as the present invention which in turn is a continuation of application Serial No. 30,824 by Leslie R. Burt, filed May 23, 1960 now abandoned for "Germicidal Air Purifier" and assigned to the same assignee as the present invention.

This invention relates to air treatment, and particularly to means for purifying air and collecting germs therefrom.

Air treatment devices and systems are used for conditioning air to promote the comfort and health of humans, particularly patients suffering from asthma, emphysema, and bronchial and other respiratory discomforts.

Heretofore, known air treatment devices have proven unsatisfactory in use for several reasons. One such reason is that in removing bacteria and odors, they have positively ionized the air which they treated. Many users have found positively ionized air uncomfortable. To overcome this disadvantage, some devices have included a negative ion generator for the production of the positive ions, but the negative ion generators have a dangerous tendency then to produce ozone. Another reason is that, even though they may filter out harmful bacteria from the air, the bacteria are not killed but instead remain in the device so that when the air treatment device is turned off the live bacteria return to the atmosphere, thereby undoing all that the air treater has accomplished.

Another reason why air treatment devices have not proven satisfactory is that they have not been capable of obtaining an analytical sample of bacteria from the air so that the bacteria content of the air can be determined.

An object of the present invention is to provide an air treatment device capable of killing bacteria in air flowing through the device.

Another object of the present invention is to provide a device which is selectably capable of either killing bacteria or retaining and growing bacteria for test purposes.

Another object of the present invention is to provide an air treatment device which will produce negative ions which promote comfort and health of the human body and provide a modality for the treatment of some diseases.

An air treatment device according to the present invention has an exterior and an interior housing. The exterior housing has an inlet filter means and an outlet. A blower draws air through the filter means and into the interior housing. The air passes an ultraviolet lamp in the interior housing, which lamp is capable of generating ultraviolet light having a wave length above 1800 A. A plurality of baffles is mounted in the interior housing for increasing the path length of air flowing through the housing. The air then flows through the outlet to return to the environment.

According to one optional but desirable feature of the present invention, the surfaces of the interior housing and of the baffles are provided with a reflective finish so that radiation from the ultraviolet lamps is reflected throughout the interior housing, thereby increasing the effects of the ultraviolet radiation.

According to another optional but desirable feature of the present invention, a collection medium is placed in the chamber to collect bacteria from air passing through the chamber.

According to another optional and desirable feature of the present invention, the collection medium is a growth medium for growing bacteria, and selective means is provided for selectively operating the ultraviolet lamp whereby the bacteria may be collected and grown to obtain an analytical sample of bacteria.

According to another optional and desirable feature of the present invention, a conductive screen surrounds the ultraviolet lamp which screen is negatively charged.

According to another optional and desirable feature of the present invention, the pitch of rotation of the blades of the blower is selected so as to create an electrostatic field capable of attracting and retaining radioactive and electrically-charged particles.

The above and other features of the present invention will be more fully understood from the following detailed description and the accompanying drawings, in which.

Figure 1:
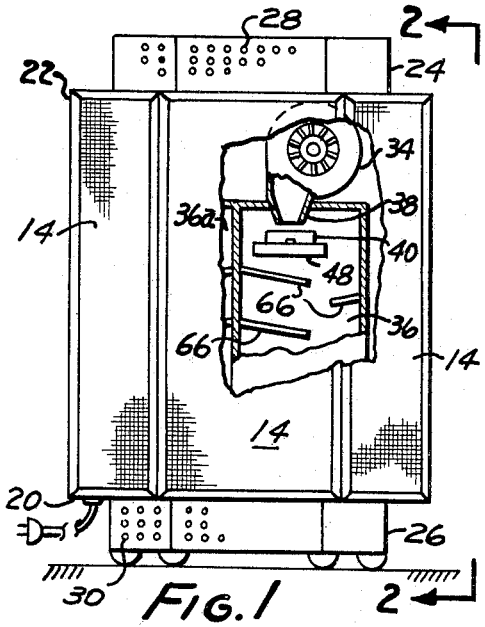
FIG. 1 is a front elevation partly in cutaway cross-section of an air treatment device according to the presently preferred embodiment of this invention.

Referring to the drawings, there is illustrated an air treatment device according to the presently preferred embodiment of the present invention. The air treatment device includes a plurality of panels 14 which form the outer portion on cover of the air treater. As shown, there are six of these panels, representing a construction which is hexagonal in horizontal cross-section, but it is to be understood that the size, shape and countour of the apparatus may be varied to meet requirements or for adaption to different locations. Panels 14 are removably fitted into horizontal frames 20 and 22 at the bottom and top of the apparatus.

Figure 2:
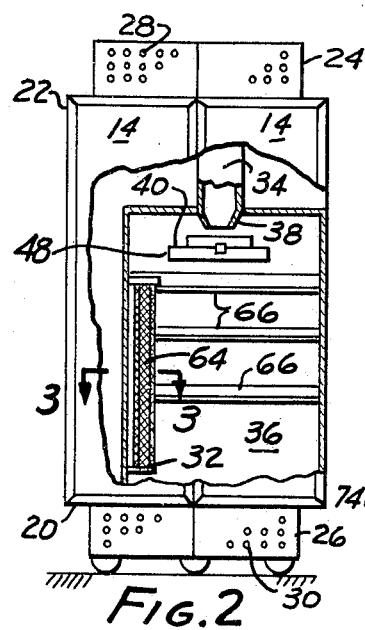
FIG. 2 is a side elevation partly in cutaway cross-section taken at line 2—2 in FIG. 1.

Upper frame 22 supports air duct 24 and lower frame 20 supports air duct 26. Air duct 24 and 26 may be of a size and shape to conform to the general outlines of the apparatus, and include perforated panels 28 and 30, respectively, as best shown in FIGS. 1 and 2. As will be more fully explained hereinafter, the upper and lower panels 28 and 30 are employed as exhaust ducts for purified air, and the side panels 14 provide inlets to admit contaminated air into the air treatment device.

Side panels 14 are preferably provided with screens and filter sheets for incoming air which screens and filters are removable and replaceable, but which when installed to form a portion of the casing will filter out particulate matter from the air which flows therethrough, thereby removing pollen, dust and other particles, including many or most odor-carrying particles.

Figures 3, 7:
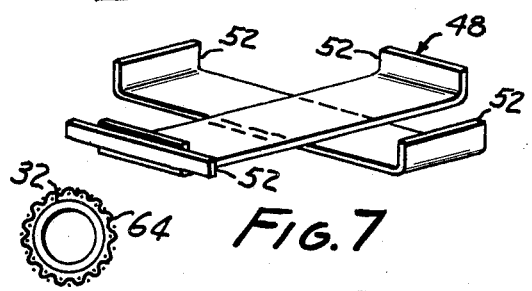
FIG. 3 is a top elevation in cutaway cross-section taken at line 3—3 in FIG. 2.
FIG. 7 is a perspective view, illustrating one type of holder or bracket holding the bacteria collecting means in the apparatus illustrated in FIG. 1.

The housing formed by side panels 14 is preferably divided into a plurality of chambers 36, 36a each containing one or more ultraviolet germicidal tubes 32. As shown particularly in FIG. 3, a conductive screen 64 surrounds each ultraviolet tube for purposes to be explained hereinafter. A squirrel cage blower 34 is mounted to each chamber 36, 36a and is adapted to draw air through the inlet filters and force it through outlet 38 and into the outlet chambers.

It is preferred that the blower associated with one chamber be adapted to force air through its associated chamber toward lower exhaust duct 26, while the blower associated with the other chamber be adapted to force air through that other chamber toward upper exhaust duct 24. For this reason, blower 34 in chamber 36 is located at the top of chamber 36 and is adapted to force air downwardly, while the blower (no shown) in chamber 36a wardly, while the blower (not shown) in chamber 36a be adapted to force air upwardly. This arrangement permits air to be exhausted at both the upper and lower portions of the device so that drafts of air are not created within the room in which the device is operated.

A plurality of baffles 66 is arranged in each chamber to increase the path length of air flowing therethrough so as to expose the air to the ultraviolet tube for longer periods of time than would be obtained if the baffles were not present. The air is exposed to treatment for greater periods of time thereby increasing the effectiveness of the air treatment device. It is preferred that the entire interior surface of each chamber 36, 36a be provided with a polished or mirror-like finish so that the ultraviolet radiation is reflected through the respective chamber, and the effect of the ultraviolet radiation on the air is increased.

A support 48 for supporting holder 40, such as a Petri dish or the like, is mounted downstream from chute 38. Holder 40 is adapted to contain a bacteria growth medium 53, such as agar, for stimulating the growth of live bacteria collected by it.

Figure 5:
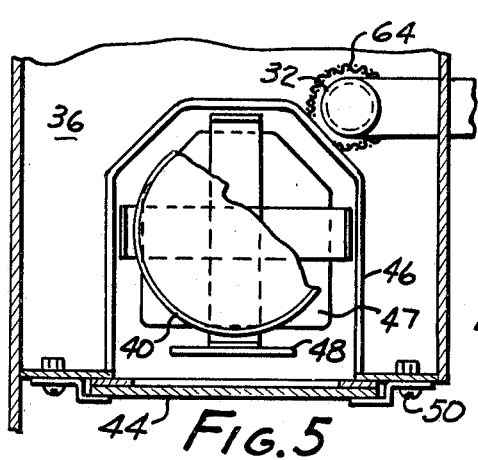
FIG. 5 is a top elevation in cutaway cross-section taken at line 5—5 in FIG. 4.

As best shown in FIGS. 4–7 inclusive, holder 40 is conveniently inserted into chamber 36 through an opening 42, closed by a slide gate 44 or the like. The holder is supported by bracket 48 (shown in greater detail in FIG. 7) which in turn is held in a framework 46 fastened onto the inside face of chamber 36 by means of screws and nuts 50. Bracket 48 has upstanding ledges 52 at the ends of its arms to prevent any inadvertent or accidental slipping of holder 40 while at the same time allowing ready circulation of air around it and onto the growth material in the holder from blower 34 and chute 38, so that bacteria may be collected in the holder from air flowing through the chamber. Holder or dish 40 is firmly clamped to bracket 48 which in turn is slid through opening 42 to rest on framework 46. As best illustrated in FIG. 5, framework 46 has an opening 47 through its base to permit the flow of air therethrough. Stops 54 are provided above gate 44 to prevent accidental displacement of the gate.

Figure 8:
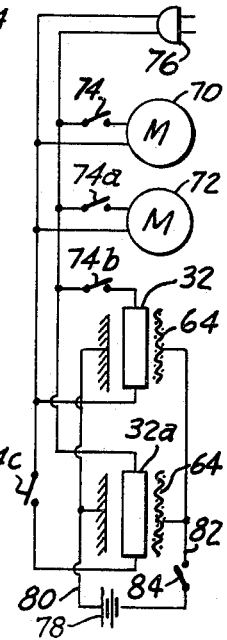
FIG. 8 is a diagram of a circuit for use with the apparatus illustrated in FIG. 1.
Figure 4:
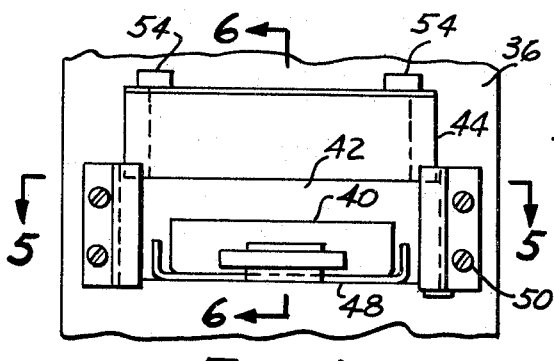
FIG. 4 is an enlarged front elevation, as in FIG. 1, illustrating means for collecting bacteria.
Figure 6:
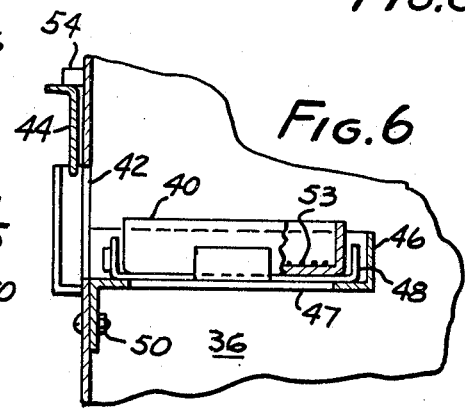
FIG. 6 is a side elevation in cutaway cross-section taken at line 6—6 in FIG. 4.

FIG. 8 illustrates a typical circuit diagram for the air treatment device according to the present invention. Motors 70 and 72 and ultraviolet lamps 32 and 32a are connected in parallel through switches 74, 74a, 74b and 74c, respectively, to plug 76. Plug 76 is adapted to be connected to a suitable wall receptacles for connection to an ordinary supply of alternating current. Battery 78 is mounted within the air treatment device and lead 80 connects the positive side of battery 78 to the metal chassis of the air treatment device, and lead 82 connects the negative side of battery 78 to screens 64 surrounding each ultraviolet tube. As shown particularly in FIGS. 2 and 3, screen 64 is in spaced relation with the sides of chambers 36, 36a so that little if any current flows through the screen and the chassis of the chamber. Since very little current is drawn from battery 78, there is little drain on the battery and it will have a long life. If desired, swich 84 may be provided in circuit with the battery to prevent unnecessary discharge of the battery when the unit is turned off. It is to be understood that any suitable AC–DC power conversion unit may be substituted form batter 78. Such a unit would preferable operate plug 76.

To operate the device according to the present invention for purposes of treating air, switches 74, 74a, 74b, 74c and 84 are moved to their on, or closed, condition, thereby energizing motors 70 and 72 to operate blowers 34, operating ultraviolet lamps 32 and 32a to generate ultraviolet radiation, and charging screen 64 to a negative potential. Air is drawn through side panels 14 and particulate matter is removed from the air by the filtering screens. The air drawn through the filters is forced by the blowers into the respective chambers 36 and past the ultraviolet lamps 32 and negative charged screen. The ultraviolet radiation kills substantially all of the bacteria in the air in the chamber so that the air discharged through ducts 26 and 28 is substantially free from live bacteria.

The negatively charged screen 64 and the ultraviolet radiation stimulate the negative ionization of air passing through the chamber. The negative ions tend to produce a beneficial physiological effect upon human beings. It has been found, for example, that negative ions in the bloodstream accelerate the delivery of oxygen to cells and tissues, frequently giving the same euphoric stimulus which is received from breathing pure oxygen. Furthermore, the beat of the cilia within the bronchial tubes and trachia tends to speed up from about 900 beats per minute to approximately 1200 beats per minute in the presence of negative ions, thereby increasing the patient's resistance to dust and pollen.

The reason that air is negatively ionized in the presence of ultraviolet radiation is not fully understood. However, it is believed that the ultraviolet radiation on the metal of the chamber walls causes electrons to be released from the metal, due to a photoelectric effect. The electrons believed to be released from the metal are believed to attach to an oxygen molecule, thereby negatively ionizing the molecule. The reflective metal surface of chambers 36 and 36a, which is preferably stainless steel, is believed to release electrons under the influence of the ultraviolet radiation to negatively ionize the air passing through the chamber.

Ultraviolet lamps 32 and 32a are designed to produce ultraviolet radiation having a wave length in the vicinity of 2437 A. It has been found that oxygen ionizes in the presence of metal and ultraviolet light having a minimum wave length of about 1019 A. It has also been found that oxygen exposed to ultraviolet light having a wave length less than about 1800 A. tends to produce ozone. To produce the desired negative ionization of air without associated production of ozone, it is necessary that the ultraviolet light having a wave length substantially above 1800 A. One suitable lamp capable of producing ultraviolet light of desired wave length is J15T8 germicidal lamp, produced by Sylvania Electronics Corporation. This lamp produces ultraviolet light having 90% of its energy emitted at 2437 A.

The baffle arrangement within each chamber causes the air to follow a serpentine path within the chamber, thereby increasing the path length of the air flow and increasing the period of time that the air is exposed to the ultraviolet radiation and negatively charged screen. The reflective surface on the chamber walls and the baffles reflects the ultraviolet radiation throughout the chamber and into blower outlet 38 so that the ultraviolet radiation is reflected throughout the chamber so that air in the chamber is more fully exposed to the radiation.

One feature of the present invention resides in the ability of the device to collect and grow analytical samples of bacteria, which samples may be subjected to conventional tests to determine the bacteria content of the environment.

To operate the device as a bacteria sampler, switches 74b and 74c are moved to their off, or open, condition. Motors 70 and 72 operate blowers 34 to force air into the chamber. Preferably, switch 84 is closed so that screen 64 is negatively charged from battery 78.

When air containing bacteria contacts the exposed growth medium 53 in the holder 40 disposed in the chamber below blower 34, a great number of bacteria are deposited upon the medium. This flow of air blown onto the growth medium in the holder causes a deposit of bacteria on the medium, which deposit reaches a significant quantity in a shorter period of time than when gravity and normal air currents are relied on. The growth medium together with the negative ions produced by negatively charged screen 64, stimulates the growth of bacteria colonies which are deposited on the medium, thereby increasing and accelerating the growth of the bacteria sample. A technician is able to secure a sufficient sample of bacteria for test purposes from the air of any particular environment in a very short time, instead of the several hours heretofore required in the use of sampling devices. For example, approximately 24 hours were heretofore required before a sufficient quantity of bacteria for test purposes could be collected using prior devices. The air treating device according to the present invention requires only about 3 hours to collect and grow the same quantity of bacteria.

After the device has been permitted to operate long enough to obtain a quantitative sample (for example, 3 hours), switches 74*b* and 74*c* are moved to their on, or closed, position. With the switches in these positions, ultraviolet lamps 32 and 32*a* are operated to produce ultraviolet radiation. If desired, switches 74, 74*a* and 84 may be turned to their off, or open position, thereby turning off the motors and removing the negative charge from screen 64.

The ultraviolet radiation produced by lamps 32 kills the bacteria gathered and retained by the growth medium in holder 40, thereby sterilizing the holder. The holder may then be removed through opening 42 in the chamber to recover bacteria for analysis purposes. The types of bacteria in the sampled environment may be determined from the recovered sample by conventional procedures.

One feature of the present invention resides in the ability of the air treatment device to remove micro-organisms and radioactive particles from the air. It has been found that by selecting a proper pitch of rotation for the blades of blower 34, the blades while moving air create an electrostatic field which attracts radioactive material and micro-organisms. By way of example, a single squirrel cage blower having 31 blades each having a length of 2½ inches from the center of rotation and rotated at a speed of 1500 revolutions per minute, has been found effective for creating an electrostatic field suitable for attracting micro-organisms and radioactive particles.

It is preferred that blowers 34 be of a single squirrel cage type. It has been found that double squirrel cage blowers capable of moving the same volume of air as a single squirrel cage blower are not as effective for removing odors from the air. The reason for this phenomenon is not known, although it is speculated that the electrostatic fields created by the rotation of each set of blower blades of a double squirrel cage blower may tend to neutralize each other, so that air containing obnoxious odors caused by bacteria is not attracted to and retained by the blades. Ultraviolet radiation from lamps 32 is directed to the blades of the blower to maintain the blower sterilized. In one test, five gram sample of particulate matter was recovered from the blades of the blower and it was found that the recovered matter had a radiation count of 52.00 counts per minute above normal background and an intensity of 72.00 micro micro curies.

The present invention thus provides an air treatment device capable of removing obnoxious odors from the air, collecting bacteria for test purposes, and generating negative ions to promote the comfort and health of patients. The air treatment device may be used for obtaining samples of bacteria from an environment or for treating air by operating the blowers, ultraviolet lamps and negative ion generator together. The negative ion generator and the ultraviolet lamps produce beneficial negative ions, and the ultraviolet lamps will kill or render harmless the bacteria.

This invention is not to be limited by the embodiment shown in the drawing and described in the description, which is given by way of example and not of limitation.

What is claimed:

1. An air treatment and bacteria sampling device comprising: an electrically conductive housing having an inlet opening and an outlet opening; filter means supported by said housing for filtering air passing through said inlet opening; a single squirrel cage blower having a plurality of blades adapted to rotate about an axis, said blower being mounted in said housing and including a blower inlet in fluid communication with said inlet opening and further including a blower outlet, said blower and said blades being so arranged and disposed as to create an electrostatic field capable of attracting radioactive and electrically charged particles and micro-organisms thereto when said blower is operated, said blower being capable of generating an air flow through said filter means and into said housing; a chamber in said housing having an inlet connected to said blower outlet and having an outlet in fluid communication with said outlet opening of said housing; a plurality of baffles in said chamber for increasing the effective length of the flow path therethrough, said baffles and said chamber being provided with a reflective finish; an ultraviolet lamp mounted in said chamber for generating ultraviolet radiation having a wave length above about 1800 A.; a perforate conductive screen surrounding said ultraviolet lamp, a D.C. source of potential in said housing; means for connecting the positive side of said D.C. source to said housing and means for connecting the negative side of said D.C. source to said screen thereby negatively charging said screen; removable support means in said chamber for removably supporting a growth medium, said support means positioning said growth medium in the path of the flow of air through said chamber and in the path of radiation from said ultraviolet lamp; a selection means for selectively operating said lamp, independent of the operation of said blower, whereby when said selection means renders said ultraviolet lamp inoperative, air is drawn into said chamber by said blower and bacteria in said air is collected and grown on said growth medium, and when said selection means renders said ultraviolet lamp operative, air is drawn through said chamber by said blower and is germicidally treated by ultraviolet radiation and negatively ionized prior to discharge from said housing through said outlet opening and the utlarviolet radiation kills the bacteria on the growth medium so that the growth medium may thereafter be removed and the bacteria tested.

References Cited

UNITED STATES PATENTS

| | | | |
|---|---|---|---|
| 3,176447 | 4/1965 | Omohundro et al. | 55—279 |
| 3,403,252 | 9/1968 | Nagy | 21—74 |
| 2,107,897 | 2/1938 | McMahan | 230—127 |
| 2,248,618 | 7/1941 | Fischer | 21—74 |
| 2,264,495 | 12/1941 | Wilner | 317—4 |
| 2,553,711 | 5/1951 | Jackson | 55—279 |
| 2,639,972 | 5/1953 | Hicks | 21—74 |
| 2,824,343 | 2/1958 | Glass | 55—279 |
| 2,825,102 | 3/1958 | Hicks et al. | 55—279 |
| 2,894,877 | 7/1959 | Sinden | 195—103.5 |
| 2,928,941 | 3/1960 | Hicks et al. | 250—44 |
| 2,941,265 | 6/1960 | Isenerg et al. | 21—74 |
| 3,065,150 | 11/1962 | Kravitz | 195—103.5 |
| 3,071,828 | 1/1963 | Cornell | 21—74 |
| 3,094,400 | 6/1963 | Blanton | 55—279 |
| 3,201,620 | 8/1965 | Ballentine | 317—4 |
| 3,299,620 | 1/1967 | Hollingsworth | 55—279 |
| 3,347,025 | 10/1967 | Wiley | 55—473 |

FOREIGN PATENTS

| | | |
|---|---|---|
| 498,015 | 12/1953 | Canada. |
| 671,516 | 10/1963 | Canada. |
| 514,377 | 11/1939 | Great Britain. |

HARRY B. THORNTON, Primary Examiner

B. NOZICK, Assistant Examiner

U.S. Cl. X.R.

21—74; 55—279, 444, 472, 483; 195—103.5; 230—127; 250—44; 317—4